Dec. 17, 1957 M. BRUCKER 2,816,682
CONTAINER
Filed April 5, 1954
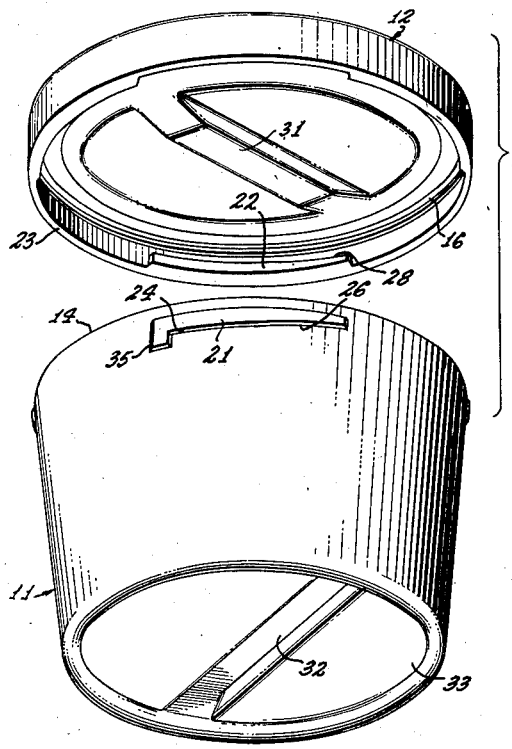
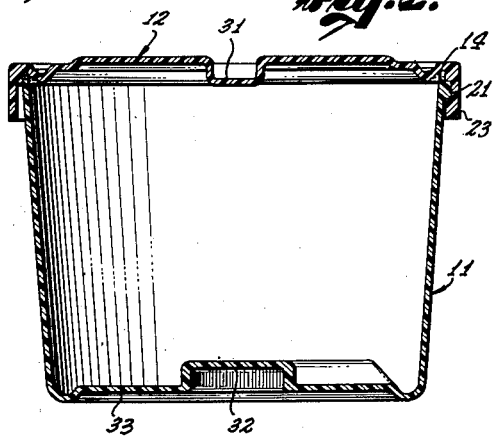
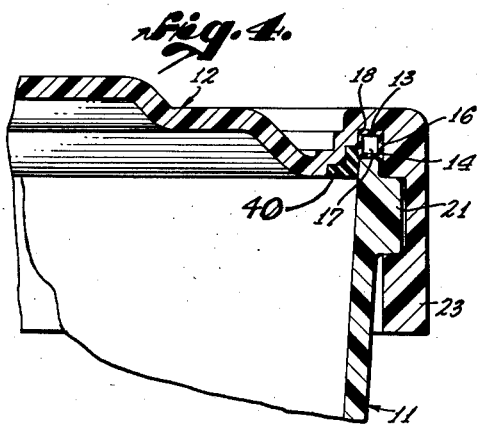
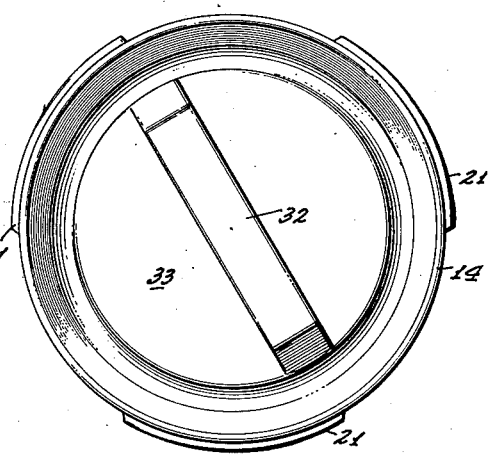
MILTON BRUCKER,
INVENTOR.
HUEBNER, BEEHLER,
WORREL & HERZIG,
ATTORNEYS.
BY

United States Patent Office 2,816,682
Patented Dec. 17, 1957

2,816,682

CONTAINER

Milton Brucker, Los Angeles, Calif., assignor, by mesne assignments, to Zenith Plastics Company, Gardena, Calif., a corporation of Delaware Application April 5, 1954, Serial No. 420,823

1 Claim. (Cl. 220—44)

This invention relates to containers, and more particularly to containers for chemicals which tend to generate gaseous pressure.

It is an object of this invention to provide a readily openable and closable container especially adaptable to contain chemicals.

It is another object of this invention to provide such a container adapted to contain chemicals which tend to generate gaseous pressure.

It is another object of this invention to provide such a container for pressure generating chemicals, which container releases the pressure when the pressure within the container has risen to a predetermined but relatively low value.

It is a further object of this invention to provide such a container capable of withstanding rough usage and handling without fracturing.

It is another object of this invention to provide such a container capable of being dropped from a considerable height, full or open, without fracturing.

In accordance with the above objects, a preferred embodiment of the present invention will now be described with reference to the accompanying drawing wherein:

Figure 1 is a perspective view of the container including its lid or cover.

Figure 2 is a vertical section taken through the container with the cover in place.

Figure 3 is a top plan view of the container with the cover removed.

Figure 4 is a fragmentary cross-section taken generally on the same cutting plane as Figure 2.

Referring to the drawing, 11 designates a round receptacle or housing to which is adapted to be clamped a cover 12. The cover 12 is adapted to close the open mouth of the recepacle 11 and to that end is adapted to fit over the receptacle as shown in Figure 2. The underface of the cover 12 is provided with a circular annular groove 13 adapted to mate with the rim 14 around the open mouth of the container 11. In the bottom of the groove 13 is a resilient gasket 16, preferably made of an annular rubber ring which is hollow in the center, as shown at 17, in order to make the ring more yieldable.

Means are provided for interlocking the cover 12 to the receptacle 11 with the rim 14 spaced a predetermined distance from the bottom surface 18 of the groove 13. By thus providing a predetermined spacing between the rim 14 and the groove bottom 18, there is assured that the gasket 16 will be compressed only to a predetermined degree. Thus when a gaseous pressure is generated inside the container, as by certain chemicals, such as calcium hypochlorite, the gasket 16 will yield and allow the pressure to be relieved by escape of some of the gases over the rim 14 and to the atmosphere. Since only a predetermined minimum spacing can ever be effected between the rim 14 and groove bottom 18, it is impossible to seal the container so tight that this predetermined gaseous pressure will not release the seal and allow escape of the excess pressure.

Such means in the present invention takes the form of a mutilated thread including a series of outwardly projecting elongate generally circumferential bosses 21 on the outer surface of the receptacle 11 which mate with complementary inwardly extending bosses 22 formed on a flange 23 which extends downwardly from the outer edge of the cover 12 proper, and forms a rim or flange for the cover 12 circumjacent the rim 14 and the upper portion of the receptacle 11. The upper surface of the bosses 21 is made truly circumferential, that is, in a plane substantially normal to the axis of the receptacle 11. The lower surface, however, is formed of two integral portions or sections, a first portion 24 which is substantially circumferential, and a second portion 26 which is generally helical, that is being formed on a taper in the manner of substantially circumferential. The upper surface of the boss 22 on the inside of the flange 23 is made substantially flush with the bottom edge of the rim 23 and is thus substantially circumferential. The upper surface of the bosses 22, on the other hand, is made in two integral sections, the first section 27 being substantially circumferential, and the second section 28 being cut on a taper, so that it actually is substantially helical.

The surfaces 26 and 28 thus form engaging cam surfaces for causing the cover 12 (and more specifically the gasket 16) to be engaged with increasing pressure against the rim of the receptacle 11. However, after the cam sections 28 have cleared their correspoding cam sections 26 then the two untapered or circumferential surfaces 27 and 24 are brought into engagement, so that further screwing of the cap 12 does not effect any further tightening of the cap on the receptacle. As clearly shown in the drawings, and particularly Fig. 4, the outer edge portion of the cover 12, directly inwardly of the flange 23, rests on the upper edge surfaces of the bosses 21 when the cover is in its closed position. Thus, the surfaces 28 of the bosses 22 of the cover draw the cover down into closed relationship to the container 11 but the edge portions of the cover engaging the tops of bosses 21 constitute stop means to limit downward movement of the cover 12. The parts are so proportioned that the bottom surface 18 of the groove 13 is held a predetermined fixed distance spaced above the rim 14 of the container 11. Thus the pressure on the gasket 16, brought about by engagement of the cover 12 on the receptacle 11, is limited to a predetermined amount, irrespective of how much the cover is screwed onto the receptacle 11. Hence, the spacing between the rim 14 and the groove bottom 18 is limited to a predetermined minimum, thereby causing a predetermined amount of compression in the rubber gasket 16. In this way it is assured that the gasket 16 always seals the container to a predetermined amount, so that when the pressure of the chemicals within the container reaches a certain low value the gasket 16 will always yield and allow escape of the excess pressure over the rim 14, as will be described.

In Fig. 4 of the drawings there appears an L-shaped gasket immediately inwardly of the rim 14 of the container 11, seated in a complementary groove in the cover 12. As clearly shown, that gasket is separate from the gasket 16. That L-shaped gasket may be completely eliminated if desired and, in fact, satisfactory containers embodying the present invention are being made without such a gasket present.

Upon the development of gas pressure inside the container 11, that pressure is exerted against the inner face of the cover 12. Since the cover 12 is of relatively thin section and is quite flexible, it tends to bow or bulge outwardly under the influence of the internal pressure. Such bowing or bulging draws that portion of the cover radially inwardly of the L-shaped gasket in an inward and upward direction, thus loosening that gasket to such an extent that gas pressure may readily by-pass the L-shaped gasket and engage the gasket 16. Of course, if the L-shaped gasket is omitted completely, gas pressure in the container has free access at all times to the inner face of the gasket 16. In either case gas pressure in the container is exerted against the inner face of the gasket 16 and distorts that gasket sufficiently to lift at least the inner bottom surface edge portion thereof away from rim 14 to admit gas pressure between gasket 16 and rim 14. Such pressure further compresses the gasket 16 away from rim 14 and when the pressure reaches a predetermined value the gasket 16 will become sufficiently compressed so that the pressurized gas may escape freely over the rim 14 in the spaces between bosses 21 and 22 and thus vent the container until the pressure therein has been reduced to the value at which the gasket 16 will again expand and re-engage rim 14. The L-shaped gasket mentioned above is identified in Figure 4 by numeral 40.

Stop means are preferably provided to limit the turning of the cover 12 on the receptacle 11. Such a means may take the form of stop abutment means 35 extending transversely from the end of one or more of the threads or bosses 21 and/or 22, against which the forward end of the complementary boss abuts. The stop 35 prevents the cover from being turned to the point where the bosses 22 lose engagement with the bosses 21 with consequent freeing of the cover.

The receptacle 11 and cover 12 are preferably made of fiberglass impregnated with a polyester resin. In order to provide a light yet strong container, it has been found that the wall thickness of the cover and container may vary from .090" to .120". Such a container, while capable of sealing the contents securely against the ingress of moisture by virtue of the seal 16, is none the less light in weight, easy to open simply by unscrewing, and capable of withstanding dropping onto a hard surface from a considerable height without fracturing.

Even though the container is sealed securely against the ingress of moisture, there is no danger of explosion due to excess pressure built up by the contents, since the gasket 16 yields when an internal pressure of greater than one-half pound per square inch is achieved within the container. Hence any excess pressure is quickly relieved without the introduction of deleterious moisture from the outside.

In order to facilitate screwing and unscrewing the cover 12, a diametrical slot 31 is formed downwardly in the cover 12 and a corresponding diametrical slot 32 is formed upwardly in the bottom 33 of the receptacle 11. These slots form convenient finger holes which enable the cover 12 and receptacle 11 to be more readily grasped and turned relative to one another.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claim.

What is claimed is:

In a container, a receptacle and a cover therefor, said cover having a greater diameter than the receptacle and having a depending flange for securing said cover on said receptacle, said receptacle having a rim around its upper open end, said cover having a continuous recess therein opening downwardly and overlying said rim, means holding said cover in fixed relation to said rim so that the uppermost wall of the recess is fixedly spaced above said rim when said cover is secured upon the container, and a resiliently compressible hollow tubular gasket in said recess compressed against the upper edge of said rim and in engagement with only the upper edge surface thereof with a predetermined pressure when said cover is secured upon said receptacle, said gasket means being resiliently yieldable upward under pressure in said container for disengaging said rim and releasing excess pressure in said container and thereafter re-seating upon said rim.

References Cited in the file of this patent
UNITED STATES PATENTS

| | | |
|---|---|---|
| 1,534,204 | Dunlap | Apr. 21, 1925 |
| 1,634,569 | Bray | July 5, 1927 |
| 1,663,822 | Walker | Mar. 27, 1928 |
| 2,012,543 | Nolan | Aug. 27, 1935 |
| 2,218,188 | Wittenberg | Oct. 15, 1940 |
| 2,311,613 | Slayter | Feb. 16, 1943 |
| 2,399,115 | Hansen et al. | Apr. 23, 1946 |
| 2,523,639 | Tucker | Sept. 26, 1950 |
| 2,552,642 | Morrison | May 15, 1951 |